United States Patent [19]

Eichler et al.

[11] 4,286,335
[45] Aug. 25, 1981

[54] COAXIAL DUAL ANTENNA CONNECTION ARRANGEMENT FOR COMMUNICATIONS APPARATUS

[75] Inventors: Jay H. Eichler, Boca Raton; Bernard Gasparaitis, Fort Lauderdale, both of Fla.

[73] Assignee: Motorola, Inc., Schaumburg, Ill.

[21] Appl. No.: 92,597

[22] Filed: Nov. 8, 1979

[51] Int. Cl.³ .................... H04B 1/38; H04B 1/08; H01O 1/24
[52] U.S. Cl. .................................. 455/89; 455/90; 455/99; 455/346; 455/351; 343/702; 200/51.1
[58] Field of Search ............... 455/89, 90, 99, 128, 455/129, 277, 289, 345–347, 351, 74; 343/702; 200/51.09, 51.1, 153 S

[56] References Cited

U.S. PATENT DOCUMENTS

| | | | |
|---|---|---|---|
| 3,134,945 | 5/1964 | Wertheimer | 455/346 |
| 3,946,390 | 3/1976 | Alexander et al. | 455/89 |
| 3,969,728 | 7/1976 | Hodsdon et al. | 343/702 |

Primary Examiner—Jin F. Ng
Attorney, Agent, or Firm—Margaret Marsh Parker; James W. Gillman

[57] ABSTRACT

Apparatus having an integral coaxial antenna coupled via a coaxial connector to its internal circuitry has a coaxial switch/connector for alternatively coupling an external coaxial signal source to the internal circuitry, thus reducing impedance mismatch to a minimum with no impedance matching network required.

5 Claims, 4 Drawing Figures

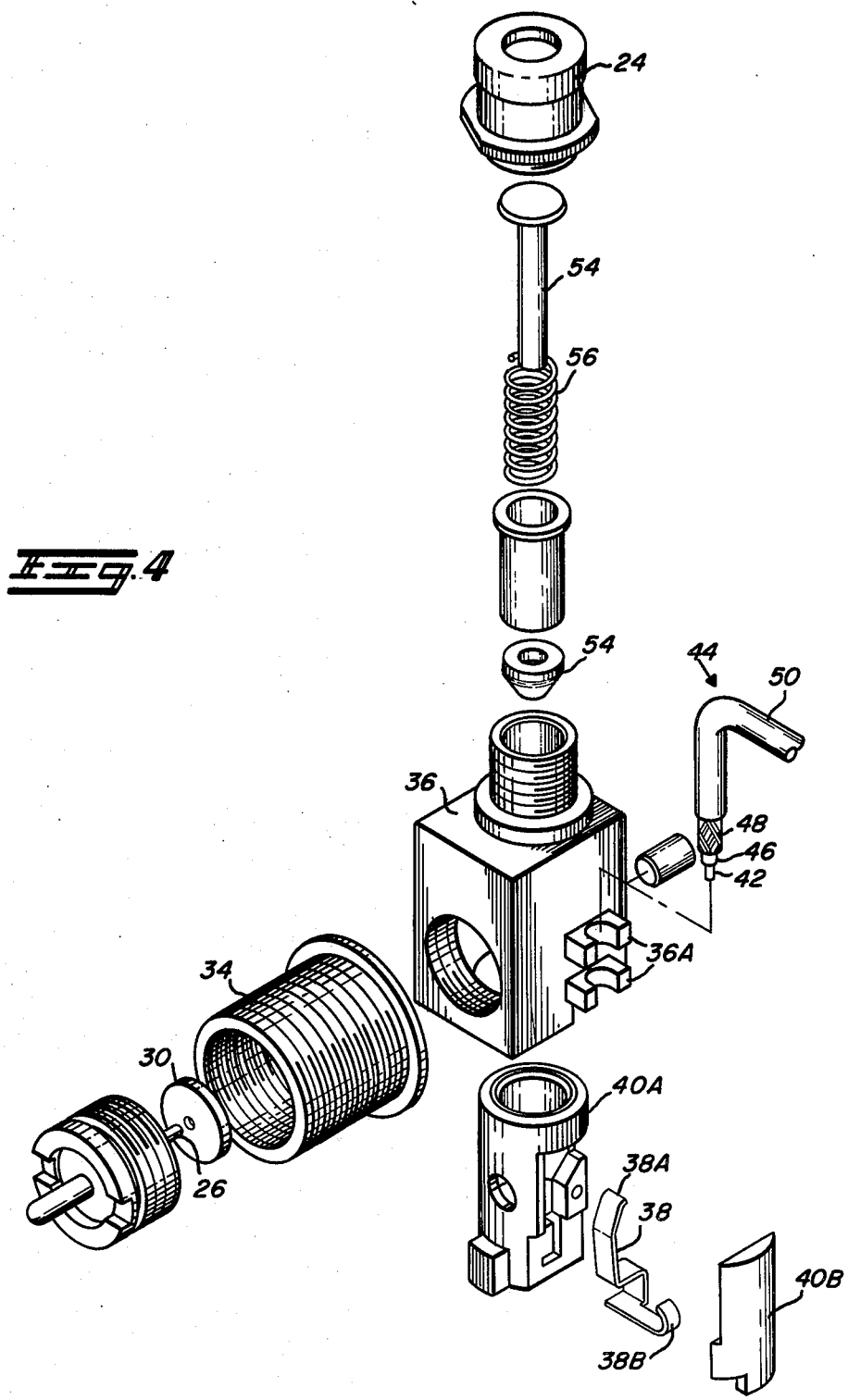

COAXIAL DUAL ANTENNA CONNECTION ARRANGEMENT FOR COMMUNICATIONS APPARATUS

BACKGROUND OF THE INVENTION

This invention relates to the field of communications apparatus having the capability of switching from an integral to an external antenna and, more particularly, to such capability including integral impedance matching.

Many kinds of apparatus are known which require switching from one antenna to another and there are many types of interconnect arrangements which will switch automatically as, for example, when a portable device is inserted into a higher powered unit in a vehicle. In such a case, the portable antenna may be either inadequate or too shielded by the vehicle body for transmission and reception over longer distances. Such an arrangement is shown in U.S. Pat. No. 3,946,390, issued Mar. 23, 1976, and assigned to the same asignee as is the present invention. In that arrangement, a coaxial connector on the end of a coaxial cable activated a conductive plunger which disconnected the integral antenna from the radio circuit and connected an external signal source from an external antenna to the radio circuit. Neither the integral antenna nor the cable connection to the radio circuitry were of a coaxial configuration, and the switching arrangement did not require shielding at the frequencies used (300 MHz). At higher (UHF) frequencies, both the shielding and mismatch problems become acute and a different switch/connector arrangement is required.

SUMMARY OF THE INVENTION

It is an object therefore of the present invention to provide a switch/connector arrangement for UHF circuitry which is essentially coaxial in all operational modes.

It is a particular object to provide such an arrangement for a small portable communications device having two antenna connections, and with minimal impedance mismatch.

These objects and others which will become apparent are attained in an arrangement in accordance with the present invention wherein the apparatus is contained within an insulating housing. Mounted on this housing, preferably releasably, is a small coaxial antenna. The center conductor of the antenna contacts the resilient center conductor of a coaxial switch/connector having a conductive housing, the resilient conductor being coupled to the center conductor of a coaxial cable for bringing received signals to the radio circuitry of the apparatus. When the apparatus is inserted into an external device such as a mobile radio in a vehicle, another coaxial cable is automatically coupled to the apparatus with the cable center conductor actuating a spring-loaded plunger to disconnect the small antenna center conductor from the resilient conductor of the switch/connector and to connect, instead, an external antenna to the apparatus circuitry. Each signal path is essentially a 50 ohm coaxial path, eliminating the need for antenna impedance matching circuits in the apparatus.

BRIEF DESCRIPTION OF THE DRAWING

FIG. 4 is an exploded view of the components of the switch/connector of FIG. 2.

DETAILED DESCRIPTION OF THE PREFERRED EMBODIMENT

Figure 1:
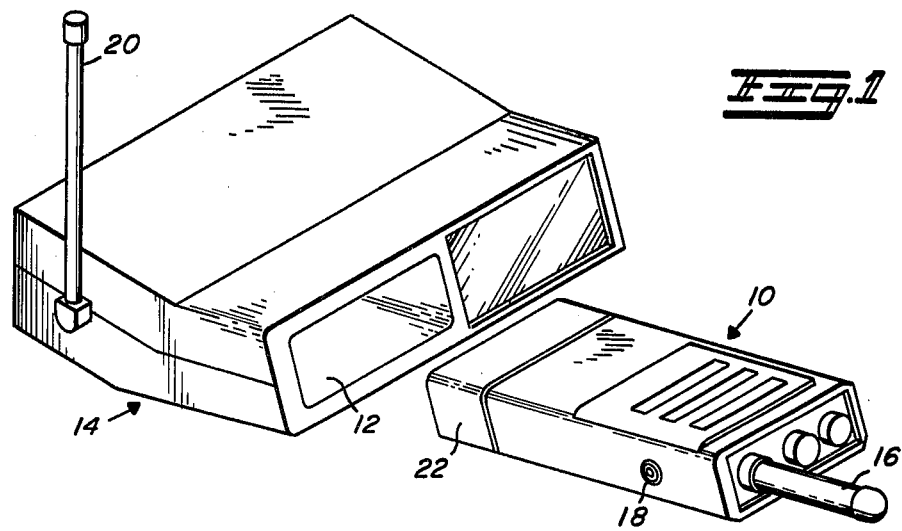
FIG. 1 is an overall perspective view of typical apparatus utilizing the invention.

The present invention will be best understood with reference to the drawing figures in which like parts have like reference numerals throughout.

FIG. 1 shows, in exemplary fashion only, two-way communications apparatus such as might utilize the present invention. A small, portable two-way radio transceiver 10 such as might be used by a public safety officer is about to be inserted into a receptacle 12 of a unit 14 such as a mobile radio/charger unit in a vehicle. The portable unit 10 has an insulating housing 15 and includes a relatively small antenna 16 which requires a 50 ohm matching impedance. One such antenna is shown in a copending application, Ser. No. 903,318, filed May 1, 1978, now U.S. Pat. No. 4,205,319, issued May 27, 1980. A switch/connector 18 in the portable unit 10 allows the antenna 16 to be disconnected automatically from the internal circuitry of the portable unit as the portable unit is inserted, and an antenna 20 of the mobile unit 14 to be connected instead. A battery pack 22 of the portable unit may be charged at the same time. The antenna 20 is shown here as directly attached to the mobile unit, but it will be appreciated that the antenna may be mounted apart from the unit 14; e.g., on the exterior of a vehicle. It is only necessary that the antenna 20 be coupled via 50 ohm coaxial line to a connector 24 (shown in FIG. 3). Other features of the portable radio may be seen here, but form no direct part of this invention.

Figure 2:
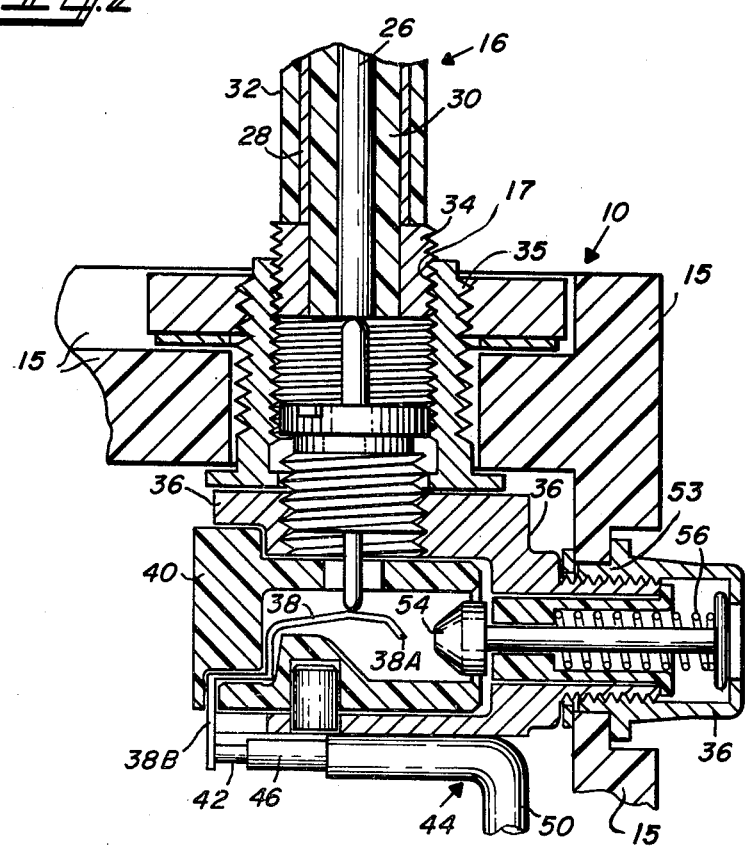
FIG. 2 is a partial cut-away view showing one embodiment of the invention in a first mode of operation.
Figure 3:
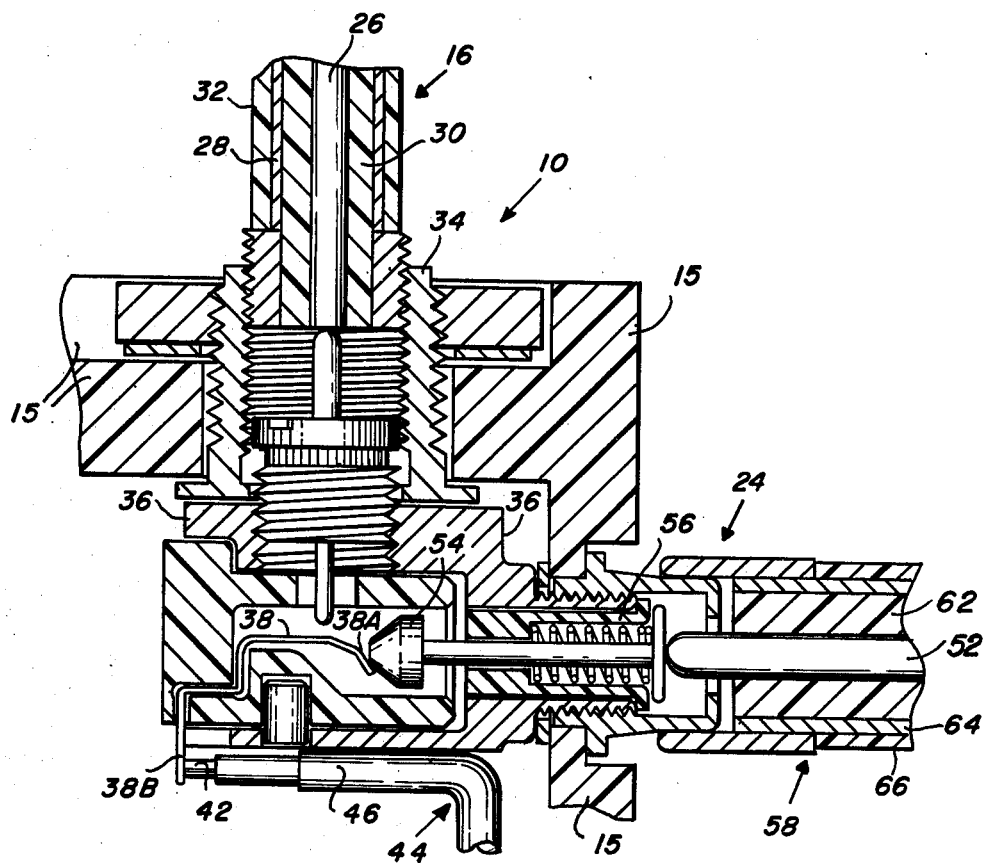
FIG. 3 is the view of FIG. 2 is a second mode of operation.

In FIG. 2, which illustrates the portable mode of operation, the switch/connector is shown largely cut away, and within a portion of the housing 15 of the portable unit 10. A portion of the antenna 16 is shown with a center conductor 26, outer conductor 28, dielectric 30 and outer insulating layer 32. The antenna 16 could be coupled to the portable unit 10 in any suitable fashion as, for example, cable connector 34 which projects through a first aperture 17 in the housing 15 and includes a threaded portion for mating with a threaded socket in the housing. The outer conductor 28 is coupled to the outer portion of the socket and to the housing 36 of the switch/connector 18. The center conductor 26 of the antenna 16 projects into the approximate center of the switch/connector and, in the detached or portable mode of operation of the unit 10, contacts one end 38A of a resilient center conductor 38 of the switch/connector. The conductor 38 is supported within the housing 36 by a molded insulating sleeve 40, as may be seen in detail in FIG. 4. Another portion 38B of the center conductor 38 is coupled to the center conductor 42 of a coaxial cable 44 which connects to the internal circuitry of the portable unit 10. The cable 44 includes, of course, dielectric 46, an outer conductor 48 which is connected to the housing 36, and an outer insulator 50. It should be noted here that the outer portion 38B of the switch center conductor 38 is shown in FIGS. 2 and 3 as coming out in the plane of the paper whereas, in FIG. 4, portion 38B is formed at a right angle to the portion 38A. The conformation of conductor 38 is not important in this one respect, and both drawing figures are drawn so as to provide maximum understanding of the invention.

When the portable unit 10 is inserted into the mobile unit 14, the connector 24 is automatically brought into the position shown in FIG. 3. A portion of the housing 36 projects through a second aperture 53 in the housing 15 for mating with the connector 24. A center conductor 52 of the connector 24 now contacts the head of a plunger 54 which in FIG. 2 was in contact with the housing 36 of the switch/connector 18, and the plunger is forced away from that contact against the bias of a coil spring 56. The connector 24 forms a part of a coaxial cable 58 which is coupled to the mobile antenna 20, and which comprises the center conductor 52, dielectric 62, outer conductor 64, and insulating layer 66. The same motion of the plunger 54 which breaks its contact with the switch/connector housing 36 forces the plunger against the movable end 38A of the resilient contact 38, breaking the electrical connection between the end 38A and the center conductor 26 of the antenna 16. Since both of the positions of the contact end 38A are very close to the longitudinal axis of the switch/connector housing 36, the switch/connector 18 remains in essentially coaxial configuration in either of the portable or mobile modes of operation.

FIG. 4 is an exploded view of the switch/connector 18 showing additional details of this embodiment. The switch/connector housing 36 may have integral projections 36A for facilitating the positioning of the coaxial cable 44 and the soldering of the outer conductor 48 to the housing 36. The resilient conductor portion 38B will project through an opening (not visible) adjacent the projections 36A and would, preferably, wrap around the exposed end of the center conductor 42 of cable 48. The molded insulator 40, which positions and insulates the conductor 38, may be made in two portions 40A, 40B for easier insertion into the housing 36.

Thus, it will be apparent that in the portable mode of operation, incoming signals are coupled from the antenna center conductor 26 via the switch/connector center conductor 38 to the center conductor 42 of the coaxial cable 44 leading to the radio circuitry. In the mobile mode of operation, incoming signals are coupled from the center conductor 52 of the coaxial cable connected to the mobile antenna 20, via the center conductor 38 of the switch/connector to the center conductor 42 of the coaxial cable leading to the circuitry. Since, as shown in the drawing and described hereinabove, the resilient end 38A of the switch/connector center conductor 38 is in approximately the center of the switch/connector housing 36 in both modes of operation, the incoming signal is carried via coaxial (50 ohm) line with no impedance matching networks required.

Other variations and modifications of the invention are possible and it is intended to cover all those included within the spirit and scope of the appended claims.

What is claimed is:

1. An interconnection arrangement as for ultra high frequency communications apparatus containing radio circuitry, the arrangement comprising in combination:
   a housing formed of an insulating material and having at least first and second apertures in the walls thereof;
   a coaxial switch/connector retained within the insulating housing and including a conductive housing member having first and second apertures aligned with the first and second apertures respectively of the insulating housing, an insulating sleeve member retained within the conductive housing member and having first and second apertures aligned with the first and second apertures respectively of the conductive housing, a resilient conductive member retained by the insulating sleeve member with a first movable portion within the conductive housing and a second portion projecting from the conductive housing, the first portion having first and second positions, and in both positions being approximately axially aligned in the conductive housing member, a rigid conductive member movably supported within the sleeve member and having a first position in contact with the conductive housing member and a second position for moving the resilient conductive member from the first to the second position, and means for biasing the rigid conductive member into the first position;
   a coaxial antenna having a first centrally located conductive element positioned to enter the insulating housing through the first aperture therein for coupling to the resilient conductive member when in the first position, and a second conductive outer element spaced from the first element and coupled to the conductive housing member adjacent the first aperture therein;
   a first coaxial cable having a first centrally positioned conductive element for coupling the radio circuitry to the second portion of the resilient conductive member of the coaxial connector, and a second, outer conductive element spaced apart from the first element and coupled to the conductive housing member; and
   a second coaxial cable for coupling signals from a second antenna to the radio circuitry and having a first centrally located conductive element adapted to be aligned with the second aperture of the insulating housing for contacting and moving the rigid conductive member of the coaxial connector from the first to the second position, disconnecting the centrally located element of the coaxial antenna from the resilient conductive member, and a second, outer conductive element spaced apart from the first element and coupled to the conductive housing member of the coaxial connector.

2. An interconnection arrangement as claimed in claim 1 wherein the insulating sleeve member of the switch/connector is molded in two mating portions for ease of insertion into the conductive housing member.

3. An interconnection arrangement as claimed in claim 1 wherein the coaxial antenna is releasably attached to the apparatus.

4. An interconnection arrangement as claimed in claim 1 wherein the apparatus includes a portable unit within the insulating housing and a mobile unit including the second coaxial cable and wherein the second coaxial cable includes a coaxial connector means for automatically aligning the cable when the portable unit is inserted into the mobile unit.

5. An interconnection arrangement as claimed in claim 1 wherein the conductive housing member includes means for coupling to the outer conductive element of the first coaxial cable.

* * * * *